United States Patent [19]

Mesnel et al.

[11] Patent Number: 4,888,917
[45] Date of Patent: Dec. 26, 1989

[54] DEFORMABLE SEALING MEMBER

[75] Inventors: Francois Mesnel, Neuilly sur Seine; Gérard Mesnel, Carrieres-sur-Seine, both of France

[73] Assignee: Establissements Mesnel, Carrieres sur Seine, France

[21] Appl. No.: 223,858

[22] Filed: Jul. 25, 1988

[30] Foreign Application Priority Data

Jul. 23, 1987 [FR] France ................................. 87 10462

[51] Int. Cl.⁴ .............................................. E06B 7/16
[52] U.S. Cl. ......................................... 49/479; 49/491
[58] Field of Search .................. 49/479, 496, 491, 490

[56] References Cited

U.S. PATENT DOCUMENTS

| | | | |
|---|---|---|---|
| 3,108,338 | 10/1963 | Stec et al. ............................... | 49/479 |
| 3,788,008 | 1/1974 | Yackiw et al. .......................... | 49/496 |
| 4,107,898 | 8/1978 | Andrzejewski et al. .......... | 49/490 X |
| 4,470,223 | 9/1984 | Mesnel .............................. | 49/491 X |
| 4,769,947 | 9/1988 | Ogawa et al. .......................... | 49/479 |
| 4,783,931 | 11/1988 | Kirkwood .......................... | 49/491 X |

FOREIGN PATENT DOCUMENTS

| | | |
|---|---|---|
| 107927 | 3/1971 | Fed. Rep. of Germany . |
| 3512973A1 | 11/1985 | Fed. Rep. of Germany . |
| 204475 | 1/1986 | Fed. Rep. of Germany . |
| 2349772 | 11/1977 | France . |
| 2184398A | 6/1987 | United Kingdom . |

Primary Examiner—Philip C. Kannan
Attorney, Agent, or Firm—Foley & Lardner, Schwartz, Jeffery, Schwaab, Mack, Blumenthal & Evans

[57] ABSTRACT

A sealing joint for a sliding window pane in an automobile door deforms to a shape which accommodates the mating corners of the window pane and the associated window frame. The sealing joint is a one piece extrusion of synthetic material and includes first and second parts. The first part is generally U-shaped. The second part includes a deformable core of metallic material.

9 Claims, 2 Drawing Sheets

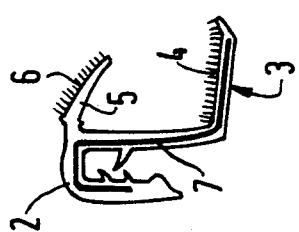
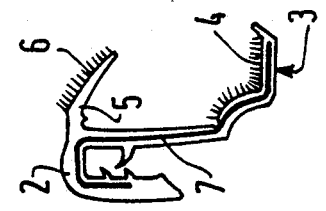
FIG.4a  FIG.4b
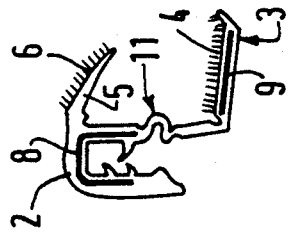
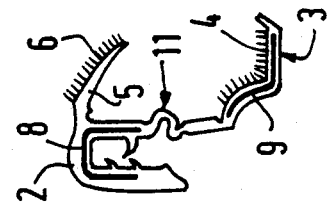
FIG.5a  FIG.5b
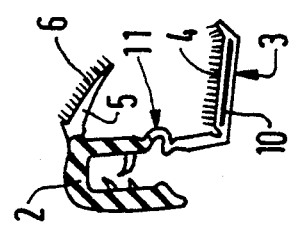
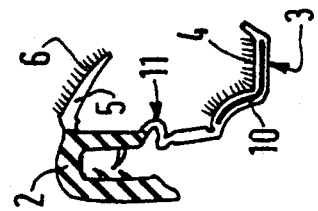
FIG.6a  FIG.6b
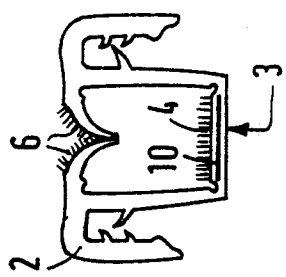
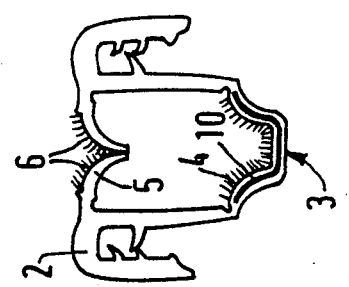
FIG.7a  FIG.7b

DEFORMABLE SEALING MEMBER

BACKGROUND OF THE INVENTION

The present invention relates to a piece made from a section forming a sealing joint for a sliding window, in particular for an automobile door.

To this end, it is known to use sealing systems comprising a main section of rubber or of reinforced plastics material, of which a U-shaped part covers and pinches one edge of the frame of the window pane, and of which another part serves as a receiver for an auxiliary section forming a seal. One or more lips of this seal press against the outer face of the sliding window pane in the closed position of the latter, while there presses on the other face a lip of the main section (see, for example, French Patent Application No. 86/03,886 of Mar. 19, 1986, in the name of the Applicant).

However, the production of such sealing systems, which comprise two separate pieces, is long and relatively complex. The use of sections in one piece has also been proposed of which one part, as above, is fastened to the frame of the window pane and has a lip which bears against the outer face of the window pane in the closed position of the latter, while another part, suitable to be displaced when urged by the moving window pane, bears by means of lips against the edge of the latter and against its inner face (see German Patent Application No. 3,512,973).

Of course, it is essential that, in such sealing systems, the section in one piece, which forms the seal, matches exactly the shape of the frame of the window and, in particular, the part intended to ensure sealing bears perfectly against the bottom of the frame, of which the section is generally in the shape of a U or an L. In practice, this causes serious problems, since this part of the section, of rubber or of plastics material, necessarily has a metal core which is bonded or "adhesively promoted" by a rubber/metal bonding agent to maintain its position in the frame after it has been deformed to match its profile. In the corner parts of the frame, or even in the rounded parts, of which the cross-section often has a complicated profile, and where there is a risk of air escaping in the closed position of the window, such a configuration of the section is difficult to achieve, and it is often necessary to modify the geometry of the section, with or without cutting beforehand, by adjoining rubber by means of overmolding onto the corresponding part of the section to obtain satisfactory sealing. Of course, this complicates the operations for producing the piece and increases the cost price.

The foregoing illustrates limitations known to exist in present devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

It is therefore an object of the present invention to provide a sealing joint for a sliding window pane in an automobile door.

It is a further object of the present invention to provide a joint which deforms to a shape accommodating the mating corners of the window pane and an associated window frame.

The foregoing is accomplished by providing a one piece extrusion of synthetic material, at least partly reinforced, for a sliding window frame, of which at least one part forms a sealing joint for the window in a window-closed position, the piece being of the type comprising a first part of U-shaped section, which covers and pinches a rabbet of the frame, and a second part, adjoining the first part and intended to come into contact with an edge portion of an associated sliding window pane in the window-closed position, bears against a surface of the frame, substantially adjacent to the rabbet, wherein the said second part has a core of a metallic material of deformable quality, which enables the piece, including the core, to be deformed to a shape corresponding to similarly shaped corners of the pane and the frame.

The foregoing and other aspects will become apparent from the following detailed description of the invention when considered in conjunction with the accompanying drawing. It is to be expressly understood, however, that the drawing is not intended as a definition of the invention but is for the purpose of illustration only.

BRIEF DESCRIPTION OF THE DRAWINGS

FIG. 4a is a cross-section along the line IVA—IVA of FIG. 2;

FIG. 4b is a cross-section along the line IVB—IVB of FIG. 2;

FIGS. 5a and 5b are equivalent views to FIGS. 4a and 4b of a second embodiment of the invention;

FIGS. 6a and 6b and are equivalent views to FIGS. 4a and 4b of a third embodiment of the invention; and FIGS. 7a and 7b are equivalent views to FIGS. 4a and 4b of a fourth embodiment of the invention.

DETAILED DESCRIPTION OF THE PREFERRED EMBODIMENTS

Figure 1:
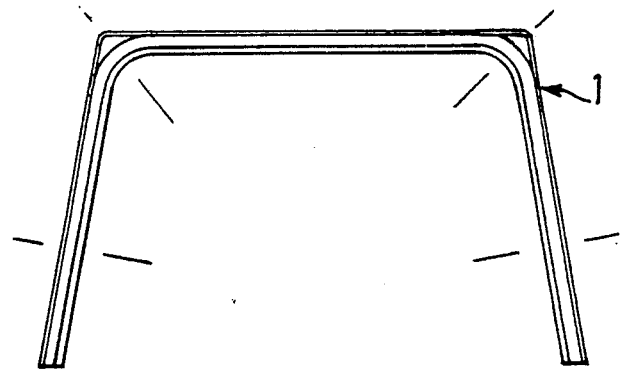
FIG. 1 is a diagrammatic plan view of a section forming a seal in accordance with the invention.

The present invention aims to overcome the disadvantages of prior devices by putting forward a piece made from a section of rubber or of reinforced plastics material, forming a sealing joint for the frame of a sliding window pane, which can perfectly match, simply by deformation, the profile of the frame, even in the corner or rounded parts of the latter, without requiring the addition of rubber or plastics material after deformation.

To this end, the subject of the invention is a piece made from a section of rubber or plastics material, at least partly reinforced, for the frame of a sliding window, of which at least one part forms a sealing joint for the window in the closed position of the latter. The section comprises a first part of U-shaped section which covers and pinches a rabbet of the frame, and a second part, adjoining the first part and intended to come into contact with the edge of the sliding window pane in the closed position of the latter. The second bears against a bottom surface of the frame, substantially perpendicular to the rabbet or directed obliquely with respect to the latter. The portion of the second part in contact with the bottom of the frame has a core of a metal or alloy of squashable quality, which enables a squashed piece to be obtained in the corners forming the space required for the window pane.

In the corner parts and/or parts of complicated section of the frame, it will thus be possible to deform this second part by elongating the metal or the alloy which constitutes its core, to cause it to match closely the profile of this frame.

It will be possible for this core to be composed of, for example, aluminum.

The rubber (or plastics material) used will of course be such that it can conform to the deformations of the aluminum in the course of the squashing of the latter and such that it preserves its properties with time without aging so as to maintain perfect sealing of the sliding window pane. To this end, it will be possible to use, in particular, polyolefinic polymers such as EPT or EPDM, or modified polyolefinic polymers, such as chlorinated polyethylenes or chlorosulfonated polyethylenes. Of course, this list is not limiting to those specified thereon.

It will also be possible for the first U-shaped part of the section covering a rabbet of the frame to comprise a metallic core and then be composed of flexible rubber. It will be possible for its core to be of one piece with that of the second part of the section, and, in this case, it will be of a metal or an alloy which can be squashed. It will also be possible for this core to be separate from the core of the second part, and it can then be composed, for example, of hard adhesively promoted aluminum.

Finally, it will be possible for this first part of the section not to have a metal core, and it will then be composed of hard rubber, making it suitable for pinching the part of the frame which it will cover.

It will be possible for the second part of the section to be in the shape of an L or a U, the base of the L or U being in contact with the surface of the bottom of the frame, and having a reinforcement or core of a metal or alloy of squashable quality.

Of course, in all these variants, the section will be able to comprise, in known manner, one or more lips intended to come into contact at least with the inner face of the window pane to ensure sealing in the closed position of the latter.

Figure 2:
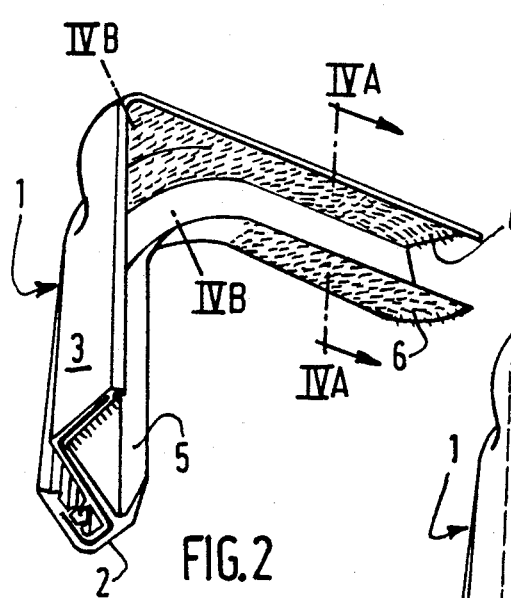
FIG. 2 is a perspective view on a larger scale and in partial section of a first embodiment of such a section.
Figure 3:
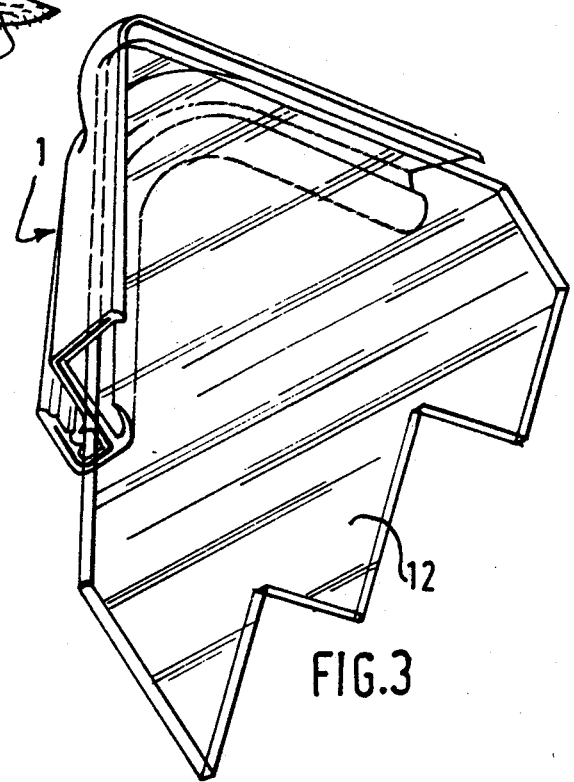
FIG. 3 shows how the section of FIGS. 1 and 2 cooperate with the moving window pane of an automobile door to ensure sealing of this window pane in the corners.

The section 1 shown in FIGS. 1 to 3 and 4a and 4b is intended to equip a frame of a sliding window pane 12 of an automobile door of generally corresponding shape. In the corners, this frame has a markedly angular profile, and it is thus necessary, as seen in FIG. 3, for the section to match closely this shape in order to ensure perfect sealing of the window 12 in the closed position, without air passing through at the corners.

As seen in FIG. 2, this section comprises a part 2 of U-shaped section, intended to cover and pinch a rabbet of the frame, and a part 3, forming a flange, adjoining the above-mentioned part and intended to take up a position at the bottom of the frame. It is against this part 3 that the window pane comes to bear in the raised position and, in order to ensure sealing in this position, this flange 3 is covered with fibers 4 deposited by electrostatic flocking. A flexible lip 5, adjoining the base of the part 2 and suitable to be curved towards the flange 3 by the moving window pane 12 when the latter is urged towards its closed position, has on its outer surface, which is intended to come into contact with the inner face of the window pane, fibers 6 suitable for insuring sealing.

In the embodiment of FIGS. 2, 4a and 4b, the section is of flexible rubber and has a metal core 7 extending in a continuous manner into the U-shaped part 2 and into the flange 3. This core 7 is of a metal or alloy which can be squashed, for example a squashable aluminum, which enables this core to be deformed by elongating the metal with a view to making the shape of the frame match perfectly the flange 3. This is seen clearly in the corner of FIGS. 2 and 3 and emerges from a comparison of FIGS. 4a and 4b, which are respectively sections in a region without substantial deformation of the section and in a region of considerable deformation (corner of the frame).

In the variant of FIGS. 5a and 5b, where the elements already described are designated by the same reference numerals, the section is also of flexible rubber but has two separate metal cores for the parts 2 and 3. The U-shaped part 2 has a core 8 of hard aluminum, enabling it to pinch firmly the rabbet of the frame which it covers. In contrast, as above, the flange 3 has a metal core 9 of aluminum of squashable quality, which enables it to conform to the profile of the frame.

In the embodiment of FIGS. 6a and 6b, where the elements described are again designated by the same reference numerals, the U-shaped part 2 does not have a metal reinforcement but is of hard rubber, enabling it to pinch the corresponding rabbet of the frame by itself. The flange 3 and the lip 5 are of flexible rubber, but, as above, the flange 3 has a metal core 10 of aluminum of squashable quality enabling it to be deformed by elongation, as seen in FIG. 5b.

It will be seen that, in the embodiments of FIGS. 6a and 6b, the part 11 of the section connecting the U-shaped part 2 and the flange 3 forms a flexible hinge which gives the section a certain flexibility and enables it to be deformed more easily.

Finally, in the embodiment of FIGS. 7a and 7b, where the elements already described are again designated by the same reference numerals as above, the section has in general a U shape, with a view to equipping a frame of complementary profile, and it is symmetrical with respect to a central plane, each half corresponding to the section of FIGS. 6a and 6b. The part 3 of the section is composed of the base of the U, and it is this which is equipped with a squashable metal reinforcement 10.

The invention thus provides a simple solution which is easy to implement and of low cost to the problem posed by the exact configuration of the sections in one piece which form sealing joints for the profile of the frames of moving window panes.

What is claimed is:

1. An apparatus, comprising:
    a one piece extrusion of synthetic material, at least partly reinforced, for a sliding window frame and associated sliding window pane, of which at least one part forms a sealing joint for the window pane in a window-closed position, the piece comprising a first part of U-shaped section, which covers and pinches a rabbet of the frame, and a second part, adjoining the first part and intended to come into contact with an edge portion of the associated sliding window pane in the window-closed position, the second part bearing against a surface of the frame, substantially adjacent to the rabbet, wherein the second part has a core of a metallic material, said first and second parts having a straight portion and a longitudinally bent portion, the second part being spaced from said first part by an amount which varies radially outward in said bent portion to permit said second part to follow a curve of said window pane.

2. The apparatus as claimed in claim 1, wherein the metallic core extends from the second part to the first U-shaped part.

3. The apparatus as claimed in claim 1, wherein the said first U-shaped part has a metallic core separate from the core of the second part.

4. The apparatus as claimed in claim 1, wherein the first U-shaped part is formed of a hard synthetic material free of a metallic core.

5. The apparatus as claimed in claim 1, including a pair of U-shaped first parts spaced apart from one another and interconnected by a common second part having a metallic core therein.

6. An apparatus, comprising:
an attachment portion for attachment to a window frame; and
a sealing portion connected to said attachment portion and having a wall for covering an edge of a movable window received in said window frame;
wherein said sealing and attachment portions have a longitudinal extent corresponding to a longitudinal edge of said window pane and a curved section corresponding to a curved corner of said window pane, said wall of said sealing portion having a spacing from the attachment portion along said longitudinal extent, said spacing varying radially outward along said curved extent to permit said wall to follow the edge of said window pane corner.

7. An apparatus according to claim 6 wherein said varying spacing is effected through an elongation of a metal core of said sealing portion.

8. An apparatus according to claim 6 wherein said attachment portion includes a metallic core.

9. An apparatus according to claim 8 wherein said sealing portion has a metallic core which is integral with said metallic core of said attachment portion.

* * * * *